United States Patent
Ota

(10) Patent No.: US 10,216,170 B2
(45) Date of Patent: Feb. 26, 2019

(54) NUMERICAL CONTROLLER AND PROGRAM EDITING METHOD HAVING MACHINING CYCLE GENERATION FUNCTION

(71) Applicant: FANUC Corporation, Minamitsuru-gun, Yamanashi (JP)

(72) Inventor: Yasuhiro Ota, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 302 days.

(21) Appl. No.: 14/675,778

(22) Filed: Apr. 1, 2015

(65) Prior Publication Data
US 2015/0301516 A1   Oct. 22, 2015

(30) Foreign Application Priority Data
Apr. 18, 2014  (JP) .................................. 2014-086401

(51) Int. Cl.
*G05B 19/18* (2006.01)
*G05B 19/408* (2006.01)

(52) U.S. Cl.
CPC .. *G05B 19/408* (2013.01); *G05B 2219/35385* (2013.01); *G05B 2219/35399* (2013.01); *Y02P 90/265* (2015.11)

(58) Field of Classification Search
CPC ........ G05B 19/408; G05B 2219/35385; G05B 2219/35399; Y02P 90/265
See application file for complete search history.

(56) References Cited

U.S. PATENT DOCUMENTS

| | | | | |
|---|---|---|---|---|
| 3,650,018 A | * | 3/1972 | Perry | B23Q 3/157 408/35 |
| 3,783,253 A | * | 1/1974 | Anderson | G05B 19/414 318/568.1 |
| 4,550,375 A | * | 10/1985 | Sato | B23Q 41/00 318/569 |
| 5,041,985 A | * | 8/1991 | Fujita | G05B 19/408 483/1 |
| 5,313,402 A | | 5/1994 | Ito | |

(Continued)

FOREIGN PATENT DOCUMENTS

| JP | S63293607 A | 11/1988 |
|---|---|---|
| JP | H05-158518 A | 6/1993 |

(Continued)

OTHER PUBLICATIONS

Notification of Reasons for Refusal dated Oct. 27, 2015 in Japanese Patent Application No. 2014-086401 (4 pages) with an English translation (3 pages).

*Primary Examiner* — Charles R Kasenge
(74) *Attorney, Agent, or Firm* — Drinker Biddle & Reath LLP

(57) ABSTRACT

Disclosed is a numerical controller that recognizes a range between a machining command for a tool number previously designated by an NC program for machining control and a machining command for the next tool number as a single machining process, generates a machining cycle command from the recognized single machining process, and generates an NC program in which the single machining process on the NC program is replaced by the generated machining cycle command.

9 Claims, 14 Drawing Sheets

(56) References Cited

U.S. PATENT DOCUMENTS

| | | | | |
|---|---|---|---|---|
| 5,388,051 A * | 2/1995 | Seki | G05B 19/408 | 700/169 |
| 5,471,394 A * | 11/1995 | Matsumura | G05B 19/4069 | 700/180 |
| 5,619,415 A | 4/1997 | Seki et al. | | |
| 5,798,928 A * | 8/1998 | Niwa | G05B 19/40938 | 700/180 |
| 6,502,007 B1 * | 12/2002 | Kanamoto | G05B 19/40937 | 700/173 |
| 6,505,092 B1 * | 1/2003 | Fukaya | G05B 19/4068 | 700/179 |
| 6,804,575 B2 * | 10/2004 | Sagawa | G05B 19/4093 | 483/11 |
| 6,907,312 B2 * | 6/2005 | Sagawa | G05B 19/4093 | 483/11 |
| 7,096,087 B2 * | 8/2006 | Sagawa | G05B 19/4093 | 700/160 |
| 7,099,736 B2 * | 8/2006 | Fujishima | G05B 19/4183 | 700/111 |
| 7,305,745 B2 * | 12/2007 | Shibui | B23Q 16/025 | 29/39 |
| 7,363,103 B2 * | 4/2008 | Takahashi | G05B 19/40937 | 700/173 |
| 7,684,891 B2 * | 3/2010 | Okrongli | G05B 19/4083 | 234/13 |
| 7,769,484 B2 * | 8/2010 | Senda | B21D 28/12 | 483/1 |
| 8,041,445 B2 * | 10/2011 | Suh | G05B 19/40931 | 700/160 |
| 9,377,776 B2 * | 6/2016 | Nakamura | G05B 19/4103 | |
| 2003/0023341 A1 * | 1/2003 | Sagawa | G05B 19/4093 | 700/159 |
| 2003/0163208 A1 | 8/2003 | Sugiyama et al. | | |
| 2004/0186614 A1 * | 9/2004 | Yamaguchi | G05B 19/40937 | 700/179 |
| 2005/0021169 A1 * | 1/2005 | Sagawa | G05B 19/4093 | 700/180 |
| 2005/0038552 A1 * | 2/2005 | Sagawa | G05B 19/4093 | 700/181 |
| 2005/0113958 A1 * | 5/2005 | Shimizu | G05B 19/4068 | 700/181 |
| 2005/0262976 A1 * | 12/2005 | Shibui | B23Q 16/025 | 82/121 |
| 2006/0095155 A1 * | 5/2006 | Shibui | G05B 19/40938 | 700/159 |
| 2006/0149412 A1 * | 7/2006 | Fujishima | G05B 19/4183 | 700/169 |
| 2006/0161290 A1 * | 7/2006 | Takahashi | G05B 19/40937 | 700/182 |
| 2006/0173572 A1 * | 8/2006 | Sagasaki | G05B 19/4155 | 700/181 |
| 2007/0163414 A1 * | 7/2007 | Senda | B21D 28/12 | 83/684 |
| 2008/0033592 A1 * | 2/2008 | Okrongli | G05B 19/4083 | 700/179 |
| 2009/0048703 A1 * | 2/2009 | Shibui | G05B 19/40938 | 700/179 |
| 2012/0016514 A1 * | 1/2012 | Nakamura | G05B 19/4103 | 700/188 |
| 2013/0338809 A1 | 12/2013 | Kume | | |
| 2015/0355621 A1 | 12/2015 | Ikeda et al. | | |

FOREIGN PATENT DOCUMENTS

| | | |
|---|---|---|
| JP | H07-136897 A | 5/1995 |
| JP | H08-118200 A | 5/1996 |
| JP | H10-63323 A | 3/1998 |
| JP | 2003-256009 A | 9/2003 |
| JP | 3650027 B2 | 5/2005 |
| JP | 2013-175129 A | 9/2013 |
| JP | 2014-016982 A | 1/2014 |
| JP | 5414948 B1 | 2/2014 |

* cited by examiner

FIG. 3

| TOOL NUMBER | TOOL TYPE | MACHINING TYPE | TOOL NOSE RADIUS | IMAGINARY TOOL NOSE DIRECTION | CUTTING BLADE WIDTH | TOOL DIAMETER |
|---|---|---|---|---|---|---|
| 1 | GENERAL-PURPOSE | ROUGH TURNING | 0.8 | 3 | - | - |
| 2 | GENERAL-PURPOSE | FINISH TURNING | 0.4 | 3 | - | - |
| 3 | GROOVE | ROUGH GROOVING | 0.8 | 3 | 5.0 | - |
| 4 | GROOVE | FINISH GROOVING | 0.4 | 3 | 5.0 | - |
| 5 | THREAD | THREADING | 0.4 | 8 | - | - |
| 6 | DRILL | DRILLING | - | - | - | 10.0 |

FIG. 4

| MACHINING TYPE | CUTTING CONDITION 1 | CUTTING CONDITION 2 | CUTTING CONDITION 3 |
|---|---|---|---|
| ROUGH TURNING | FEED RATE | SURFACE SPEED | CUTTING DEPTH |
| FINISH TURNING | FEED RATE | SURFACE SPEED | - |
| ROUGH GROOVING | FEED RATE | SURFACE SPEED | CUTTING BLADE WIDTH |
| FINISH GROOVING | FEED RATE | SURFACE SPEED | - |
| THREADING | LEAD | SURFACE SPEED | - |
| DRILLING | FEED RATE | SPINDLE ROTATION SPEED | CUTTING DEPTH |

GENERATED MACHINING CYCLE

```
N0057 G1 X40. Z-22.894 F0.1
N0058 G2 X42.6 Z-25.146 I2.6 K0. F0.1
N0059 G1 X60. Z-30.169 F0.1
N0060 G1 X60. Z-46.119 F0.1
N0061 G2 X64.297 Z-48.68 I2.6 K0. F0.1
N0062 G1 X79.339 Z-50.006 F0.1
N0063 G1 X84. Z-50.006 F0.1
N0064 G0 X120.
N0065 G0 Z20.
N0066 G0 G18
N0067 F0.
N0068 G00 X200.
N0069 M05
N0070 G28 U0 W0
N0071 T0606
N0072 G28 G97
N0073 M03 S800
N0074 G00 X120 .Z20.
N0075 G40
N0076 G0 X0.
N0077 G0 Z2.
N0078 G83 Z-90. R0. Q20000 P0 F0.6
N0079 G80
N0080 G0 Z20.
N0081 G0 X120.
N0082 G0 G18
N0083 F0.
N0084 M05
N0085 G0 X200.
N0086 G28 U0 W0
N0087 M02
```

NUMERICAL CONTROLLER AND PROGRAM EDITING METHOD HAVING MACHINING CYCLE GENERATION FUNCTION

RELATED APPLICATION DATA

This application claims priority under 35 U.S.C. § 119 and/or § 365 to Japanese Application No. 2014-086401 filed Apr. 18, 2014, the entire contents is incorporated herein by reference.

BACKGROUND OF THE INVENTION

1. Field of the Invention

The present invention relates to a numerical controller for generating a machining cycle command from a part of a numerical control program (NC program) and to a program editing method for generating a machining cycle command from a part of an NC program.

2. Description of the Related Art

When creating an NC program for machining a workpiece, an operator has to calculate a start point and end point of a tool move path and create a relevant move command for each block. The block is a minimum unit of the NC program for designating a path.

The workpiece is machined by executing the above-described NC program. However, even when machining is actually being conducted, the NC program is often corrected or edited as needed to obtain optimal cutting conditions and others. In such an instance, the operator specifies a plurality of blocks related to machining commands and edits each of the specified blocks as needed.

In addition to a technology for directly editing an NC program, there is a technology for automatically generating data that can be input from an NC program to an NC program creation apparatus such as CAD/CAM apparatus and an automatic programming apparatus, as described, for instance, in Japanese Patent No. 3650027 (corresponding to WO 2000/011528). Further, a technology described, for instance, in Japanese Patent Application Laid-Open No. 63-293607 makes it possible to indirectly edit an NC program by extracting graphic data from the NC program and editing the graphic data on a CAD apparatus.

Meanwhile, a machining cycle command is used in a machining program. The machining cycle command is configured so that a series of move commands formed of a plurality of blocks are executed by a single command, as disclosed in, for example, in Japanese Patent Application Laid-Open No. 2014-16982. The machining cycle command defines cutting conditions and the figure of a machining area. A numerical controller for controlling a machine tool controls a movable axis by generating a plurality of move commands from the cutting conditions and machining area figure defined by the machining cycle command described in the machining program.

However, there are the following problems with conventional NC program editing method. When a workpiece is to be machined, one machine figure is formed by performing an considerable number of machining control operations with respect to each block of the NC program. As such being the case, when the NC program is to be edited, all relevant blocks need to be identified by understanding machining sequence executed by the NC program. Therefore, the identification of the blocks to be edited is time-consuming. In addition, it is necessary to edit an considerable number of blocks.

Further, introducing a technology for providing editing assistance by using a CAD/CAM apparatus or an automatic programming apparatus eliminates the necessity of directly editing individual blocks and provides labor savings by lightening a program-editing task to be performed by an operator. However, if such a technology is to be introduced, it becomes necessary to prepare large-scale equipment, such as a CAD/CAD apparatus and an automatic programming apparatus, in addition to a numerical controller. This causes a cost problem.

SUMMARY OF THE INVENTION

In view of the above-described problems in the prior art technologies, an object of the present invention is accordingly to provide a numerical controller and a program editing method that make it possible to extract cutting conditions and a machining area figure from an existing NC program and generate a machining cycle command that has a small number of blocks and can be easily edited by using an input guidance or the like on a numerical controller.

The numerical controller according to the present invention performs machining control by using an NC program. The numerical controller includes a single machining process recognition section, a machining cycle generation section, and an NC program generation section. The single machining process recognition section recognizes a range between a machining command for a tool number previously designated by the NC program and a machining command for the next tool number as a single machining process. The machining cycle generation section generates a machining cycle command from the single machining process recognized by the single machining process recognition section. The NC program generation section generates an NC program in which the single machining process on the NC program is replaced by the machining cycle command generated by the machining cycle generation section.

The machining cycle generation section may include a tool data list in which a machining type and tool figure data are defined for each tool number, identify the machining type and tool figure data in accordance with the tool data list and with a previously designated tool number, and generate a machining cycle command from the single machining process and the identified machining type and tool figure data.

The machining cycle generation section may further include a cutting condition table that associates a machining type with necessary cutting conditions, identify the cutting conditions for the machining type from the cutting condition table and the machining type, and generate a machining cycle command from the single machining process, the identified machining type and tool figure data, and the identified cutting conditions.

The machining cycle generation section may extract a cutting feed command from the machining type, the tool data, and the single machining process, generate a machining area figure by converting the extracted cutting feed command to figure element data, which is a linear or circular figure, and generate a machining cycle command from the single machining process, the identified machining type and tool figure data, the identified cutting conditions, and the generated machining area figure. The machining area figure may be generated by offsetting the figure element data by the magnitude of a tool nose radius or a tool diameter.

The program editing method according to the present invention generates an NC program that is partly replaced by a machining cycle command. The program editing method includes steps of: recognizing a range between a machining command for a tool number previously designated by the NC program and a machining command for the next tool number as a single machining process; generating a machining cycle command from the recognized single machining process; and generating an NC program in which the single machining process on the NC program is replaced by the machining cycle command.

The step of generating the machining cycle command, wherein a tool data list in which a machining type and tool figure data are defined for each tool number is stored in advance, may include identifying the machining type and tool figure data in accordance with the tool data list and with the previously designated tool number, and generating the machining cycle command from the single machining process and the identified machining type and tool figure data.

The step of generating a machining cycle command, wherein a cutting condition table that associates a machining type with necessary cutting conditions is stored in advance, and wherein cutting conditions for the machining type are identified from the cutting condition table and the machining type, may include generating the machining cycle command from the single machining process, the identified machining type and tool figure data, and the identified cutting conditions.

The step of generating a machining cycle may include extracting a cutting feed command from the machining type, the tool data, and the single machining process, generating a machining area figure by converting the extracted cutting feed command to figure element data, which is a linear or circular figure, and generating a machining cycle command from the single machining process, the identified machining type and tool figure data, the identified cutting conditions, and the generated machining area figure. The machining area figure may be generated by offsetting the figure element data by the magnitude of a tool nose radius or a tool diameter.

According to the present invention, a machining cycle command that has a small number of blocks and can be easily edited by using an input guidance or the like on a numerical controller can be generated from an existing NC program. This makes it possible to easily edit an NC program without using a CAD/CAM apparatus or an automatic programming apparatus.

BRIEF DESCRIPTION OF THE DRAWINGS

The above and other objects and features of the present invention will be apparent from the following description of an embodiment that is given with reference to the appended drawings, in which:

FIG. 3 shows an example of a tool data list stored in the machining cycle generation section shown in FIG. 2;

FIG. 4 shows an example of a cutting condition table stored in the machining cycle generation section shown in FIG. 2;

FIG. 6 is a diagram illustrating an NC program that machines the workpiece shown in FIG. 5;

FIG. 10 shows an example of a machining cycle command that is generated on an NC program in accordance with extracted cutting conditions and with a generated machining area figure;

DETAILED DESCRIPTION OF THE PREFERRED EMBODIMENT

An exemplary embodiment of a numerical controller and program editing method according to the present invention will now be described with reference to the accompanying drawings.

Figure 1:
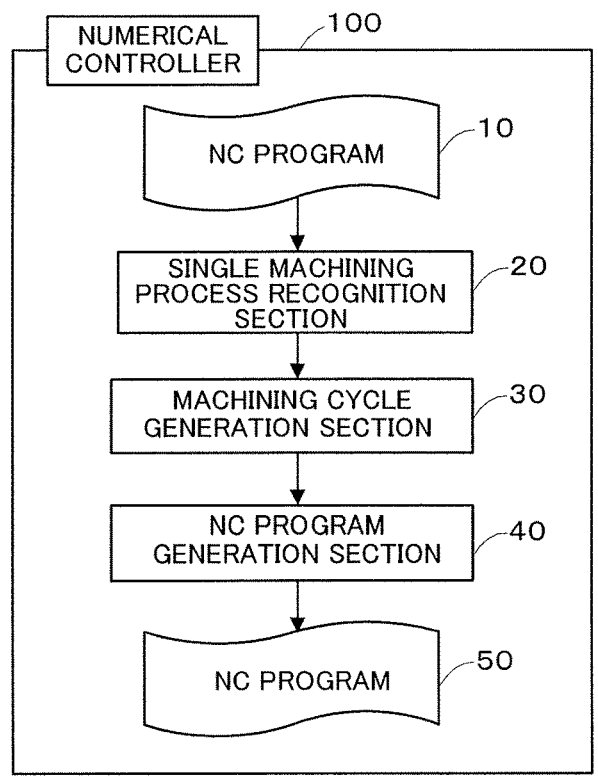
FIG. 1 is a block diagram illustrating a numerical controller according to the present invention.

FIG. 1 is a block diagram illustrating the numerical controller 100 according to the present invention.

The numerical controller 100 includes a single machining process recognition section 20, a machining cycle generation section 30, and an NC program generation section 40. The single machining process recognition section 20 recognizes a single machining process from an NC program written in ISO code. The machining cycle generation section 30 generates a machining cycle from an ISO code for the single machining process recognized by the single machining process recognition section 20. The NC program generation section 40 generates an NC program 50 in which the ISO code for the single machining process is replaced by the generated machining cycle.

Figure 2:
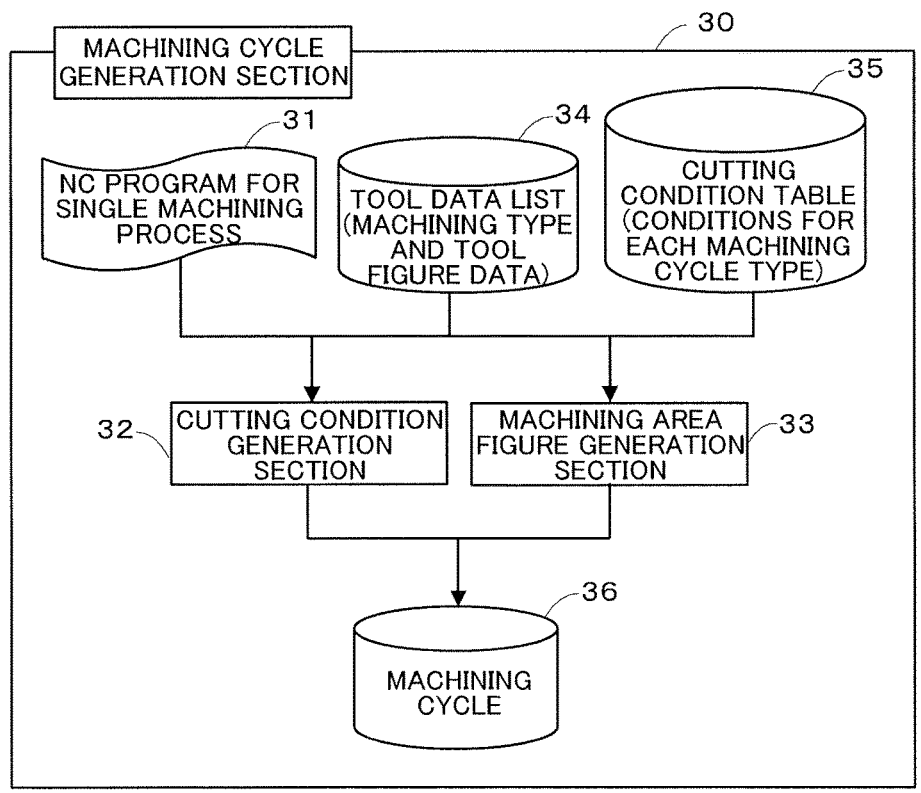
FIG. 2 is a block diagram illustrating a machining cycle generation section included in the numerical controller shown in FIG. 1.

FIG. 2 is a block diagram illustrating the machining cycle generation section 30 included in the numerical controller 100.

The machining cycle generation section 30 includes a cutting condition generation section 32, a machining area figure generation section 33, a tool data list 34, and a cutting condition table 35. The cutting condition generation section 32 extracts cutting conditions from an NC program 31 for a recognized single machining process. The machining area figure generation section 33 generates a machining area figure from the NC program 31 for the recognized single machining process. The tool data list 34 and the cutting condition table 35 are stored in a memory (not shown) or in a storage device (not shown).

FIG. 3 shows an example of the tool data list 34.

The tool data list 34 stores the type of a tool, the type of machining, and tool figure data (including a tool nose radius, an imaginary tool nose direction, a cutting blade width, and a tool diameter) in association with a tool number. In association with tool number 1, for example, a general-purpose tool is stored as the tool type, rough turning is stored as the machining type, and a tool nose radius of 0.8 and an imaginary tool nose direction of 3 are stored as the tool figure data.

FIG. 4 shows an example of the cutting condition table 35.

The cutting condition table 35 stores cutting conditions in association with a machining type. For rough turning, which is a machining type, for example, a feed rate, a surface speed, and a cutting depth are set as the cutting conditions.

Figure 5:
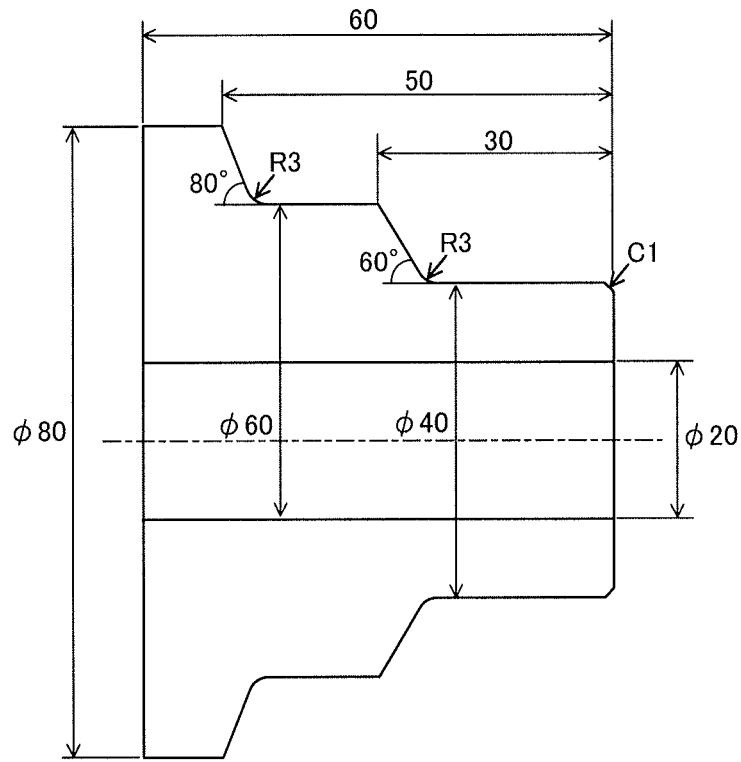
FIG. 5 is a diagram illustrating an example of a workpiece that is machined by an NC program edited by the numerical controller according to the present invention.

The following describes operating steps performed to generate a machining cycle command from an NC program on the numerical controller according to the present invention. The present embodiment will be described with reference to a case where an NC program for machining a workpiece in accordance with a drawing shown in FIG. 5 is to be edited. FIG. 6 shows the NC program that machines the workpiece in accordance with the drawing shown in FIG. 5.

The single machining process recognition section 20 recognizes a single machining process from an input NC program 10. The single machining process recognition section 20 reads the first and subsequent blocks of the NC program 10 in sequence and identifies a tool number that is used in a command range to be converted to a machining cycle. In the NC program shown in FIG. 6, tool number 1 is designated by T command "T101" for block N0002. The single machining process recognition section 20 identifies a block in which the T command appears next in block N0002 and subsequent blocks. In the NC program shown in FIG. 6, tool number 2 is designated by T command "T202" for block 0048. This indicates that a tool change is made here. In the single machining process recognition section 20, blocks up to block N0047, which immediately precedes block 0048, is recognized as a single machining process associated with tool number 1.

Next, the machining cycle generation section 30 inputs an NC program 31 for the single machining process recognized by the single machining process recognition section 20, and then generates a machining cycle. The machining cycle generation section 30 identifies the machining type associated with a tool number designated from the tool data list 34 shown in FIG. 3 by using a tool number designated in the NC program 31 for the single machining process. As tool number 1 is designated for the single machining process recognized from the NC program shown in FIG. 6, the machining type can be identified as rough turning by referring to the tool data list 34.

When the machining type is identified, the machining cycle generation section 30 uses the identified machining type to identify the cutting conditions for rough turning from the cutting condition table 35 shown in FIG. 4. As the machining type for the single machining process recognized by the NC program shown in FIG. 6 is identified as rough turning, the feed rate, surface speed, and cutting depth can be identified as the cutting conditions by referring to the cutting condition table 35. The cutting condition generation section 32 then extracts cutting conditions from the single machining process by using the identified cutting conditions. For example, F0.8 for N0010 is extracted as the feed rate in the NC program shown in FIG. 6.

Figure 7:
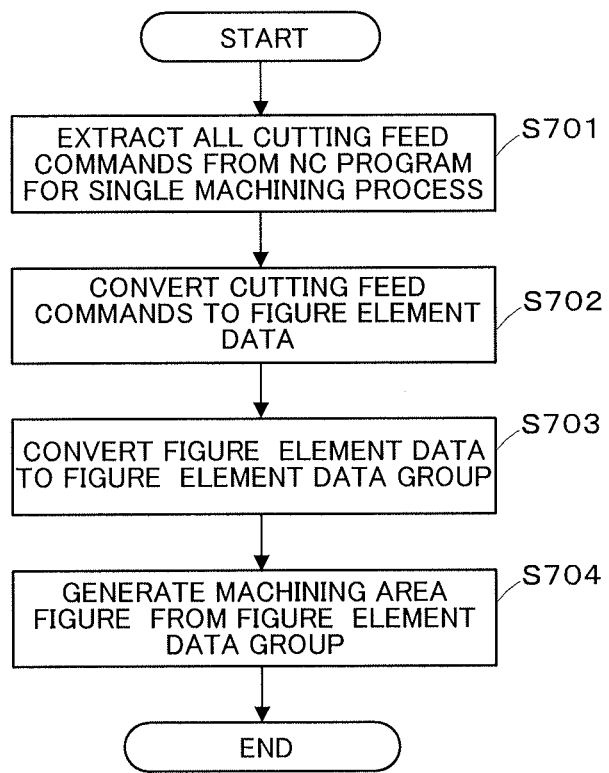
FIG. 7 is a flowchart illustrating the basics of a machining area figure generation process that is performed by a machining area figure generation section included in the machining cycle generation section shown in FIG. 2.

Next, the machining area figure generation section 33 performs a machining area figure generation process to generate a machining area figure from the NC program 31 for the single machining process recognized by the single machining process recognition section 20. The basics of the machining area figure generation process are shown in the flowchart of FIG. 7.

The machining area figure generation section 33 extracts all cutting feed commands from the NC program 31 for the single machining process recognized by the single machining process recognition section 20 (step S701). Next, the machining area figure generation section 33 converts the extracted cutting feed commands to figure element data (step S702). The machining area figure generation section 33 then converts the resulting figure element data to a figure element data group (step S703). Finally, the machining area figure generation section 33 generates a machining area figure from the figure element data group (step S704).

Figure 8:
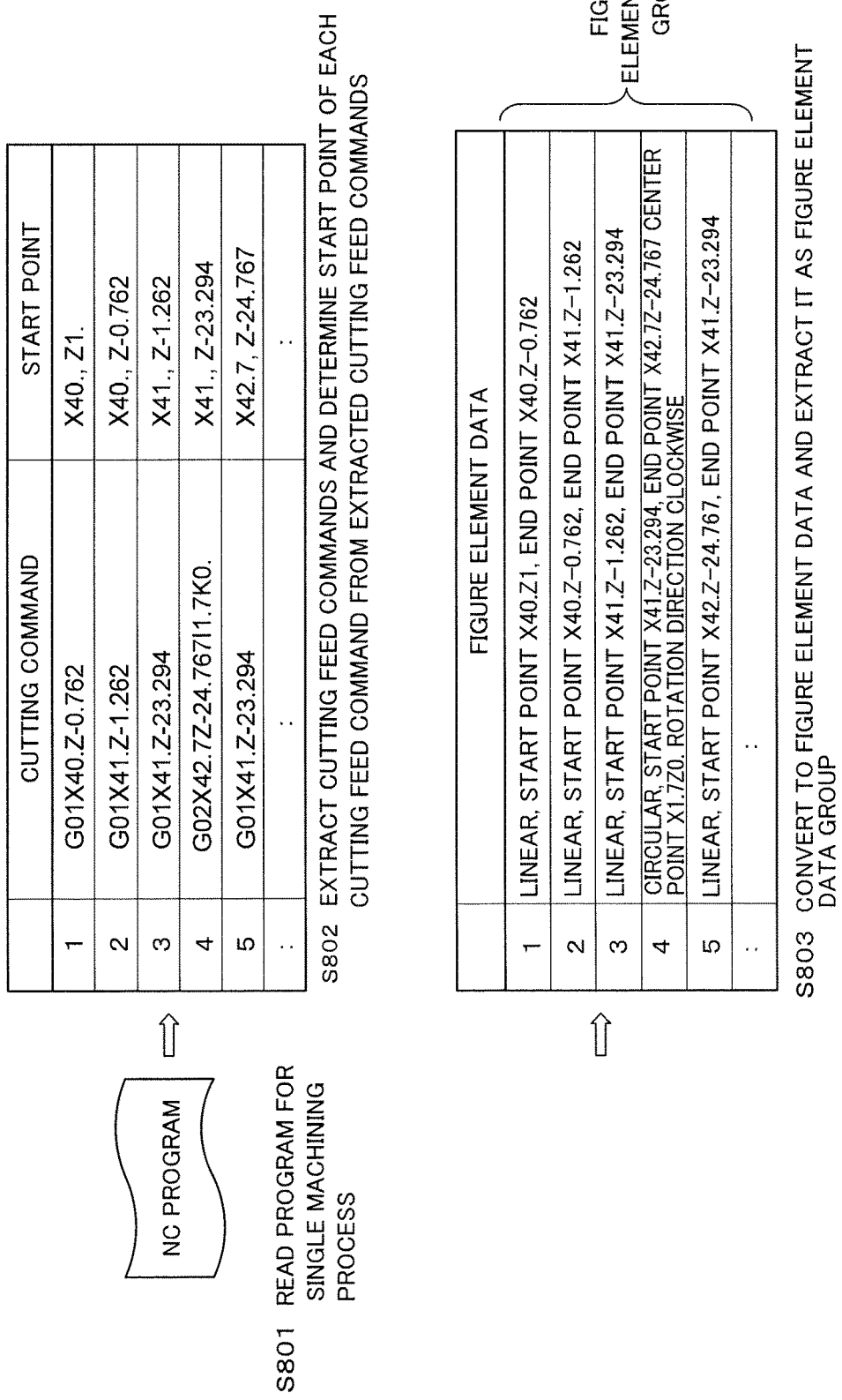
FIG. 8 illustrates steps of a process of extracting a figure element data group from the NC program shown in FIG. 6.

FIG. 8 shows an example in which the figure element data group extraction procedure (S701 to S703) are applied to the single machining process recognized from the NC program shown in FIG. 6. First of all, the machining area figure generation section 33 extracts cutting feed commands (G01, G02, etc.) from a group of blocks of the NC program for the single machining process, and determines the start point of each cutting feed command from the extracted cutting feed commands (steps S801 and S802). Next, the machining area figure generation section 33 converts information about the start points, the types of the cutting feed commands, and parameters to figure element data (step S803). If, for instance, a cutting feed command is "G01X402-0.762" and its start point is "X40., Z1.", the figure element data derived from the cutting feed command is "linear, start point X40.Z1, end point X40.Z-0.762" because G01 is linear interpolation. When each cutting feed command is subjected to the same conversion, a figure element data group is generated.

Figure 9:
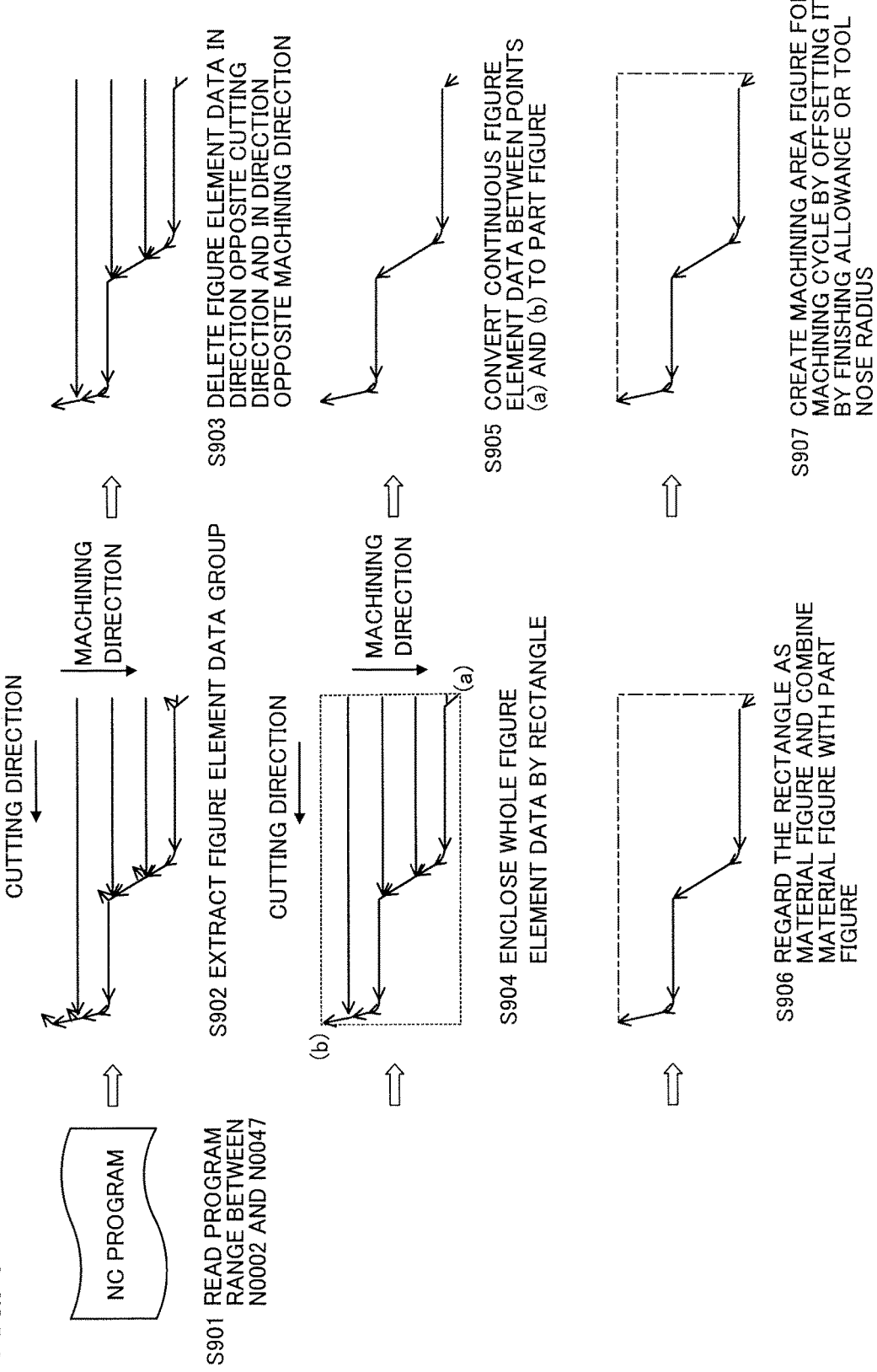
FIG. 9 illustrates steps of a process of generating a machining area figure when the type of machining is rough turning.

FIG. 9 shows a process (step S704) of generating a machining area figure in accordance with the figure element data group extracted from the NC program shown in FIG. 6. FIG. 9 shows steps of generating a machining area figure when the machining type is rough turning.

In the process of generating a machining area figure for rough turning, the machining area figure generation section 33 first extracts a figure element data group from a single machining process (N0002-N0047) recognized by the single machining process recognition section 20 (steps S901 and 902).

When the figure element data group is extracted, the machining area figure generation section 33 identifies figure element data in a direction opposite the cutting direction and figure element data in a direction opposite the machining direction from the extracted figure element data group and then deletes the identified figure element data (step S903).

Next, the machining area figure generation section 33 obtains rectangle data that includes the whole figure element data remaining after the deletion (step S904). In the present embodiment, the whole figure element data can be enclosed by a rectangle whose diagonal line is a straight line joining points (a) and (b), as indicated under S904.

Next, the machining area figure generation section 33 extracts continuous figure element data between points (a) and (b), and converts the extracted figure element data to a part figure (step S905).

Next, the rectangle obtained in step S904 is regarded as a material figure, and the material figure is combined with the part figure obtained in step S905 (step S906).

Next, a machining area figure is created by offsetting it by a finishing allowance or a tool nose radius (step S907).

Figure 10:
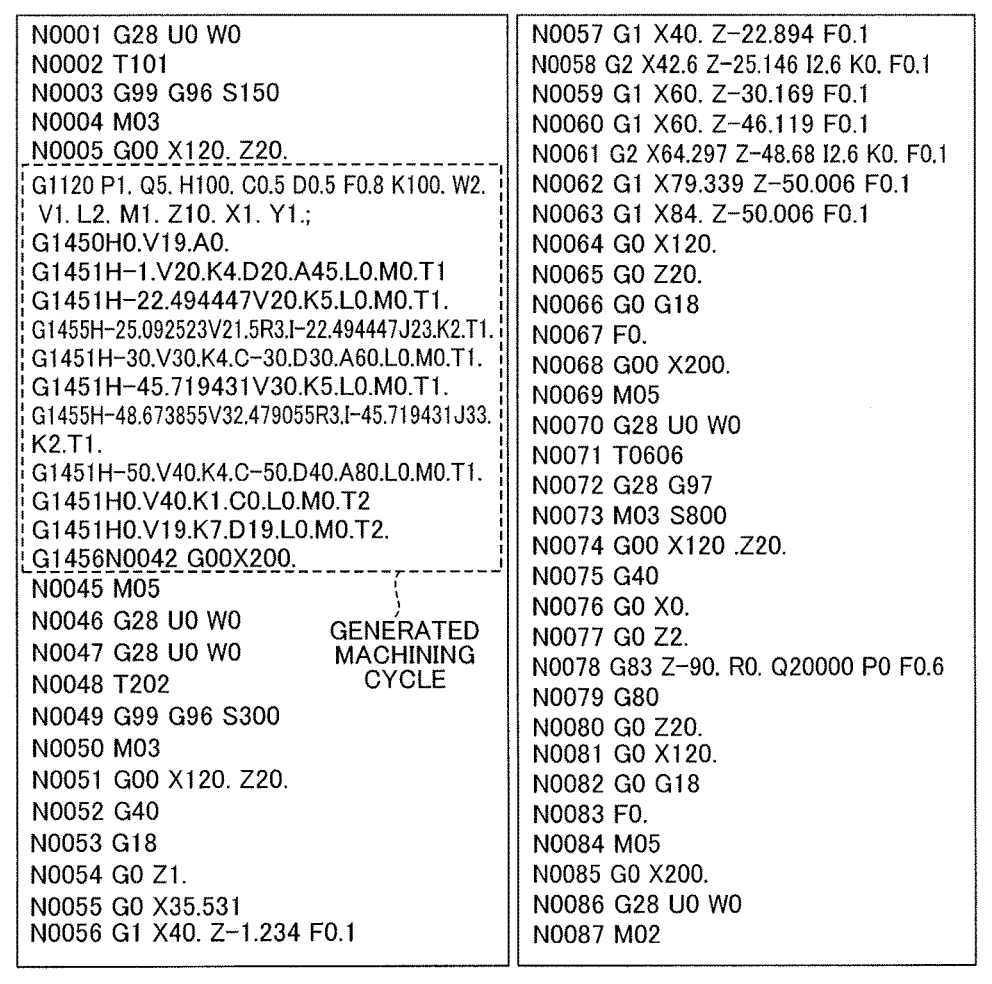

Finally, a machining cycle command editable on an NC program is generated in accordance with the cutting conditions extracted by the cutting condition generation section 32 and with the machining area figure generated by the machining area figure generation section 33. An example of the generated machining cycle command is shown in FIG. 10. In the example, command G1120 indicates the cutting conditions, and command G1450 and the subsequent commands indicate the machining area figure (individual blocks correspond to a series of figure elements in step S907).

The machining cycle command generated by performing the above-described procedure is expressed by a command that directly indicates a machining area figure. Therefore, an operator can easily edit the machining cycle command while envisioning a figure in comparison with a common NC program.

In the above-described embodiment, a process of generating a machining area figure is performed for a case where the type of machining is rough turning. However, machining area figure generation according to the present invention is not limited to rough turning. The machining area figure generation process for the other types of machining will now be exemplified.

[Procedure of Machining Area Figure Generation Process for Finish Turning]

Figure 11:
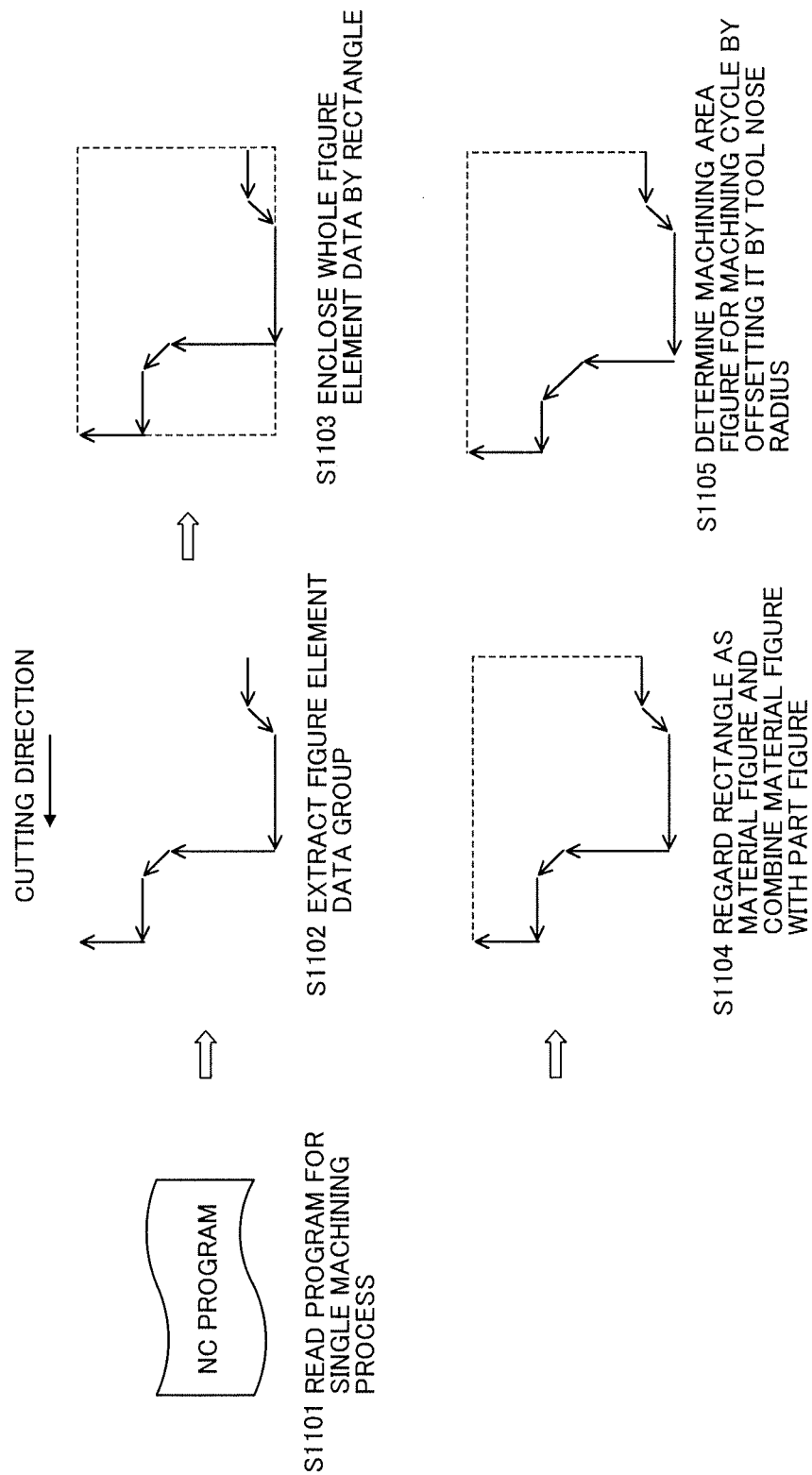
FIG. 11 illustrates steps of a process of generating a machining area figure when the type of machining is finish turning.

FIG. 11 shows a flow of machining area figure generation process that is performed when the machining type identified from a single machining process recognized by the single machining process recognition section 20 is finish turning.

In the machining area figure generation process for finish turning, the machining area figure generation section 33 first extracts a figure element data group from the single machining process recognized by the single machining process recognition section 20 (steps S1101 and S1102).

When the figure element data group is extracted, the machining area figure generation section 33 obtains rectangle data that includes the whole extracted figure element data (step S1103).

Next, the machining area figure generation section 33 converts the figure element data to a part figure, regards a rectangle obtained in step S1103 as a material figure, and combines the material figure with the part figure (step S1104).

Finally, the machining area figure generation section 33 generates a machining area figure for a machining cycle by offsetting it by a tool nose radius (step S1105).

[Procedure of Machining Area Figure Generation Process for Rough Turning Grooving]

Figure 12:
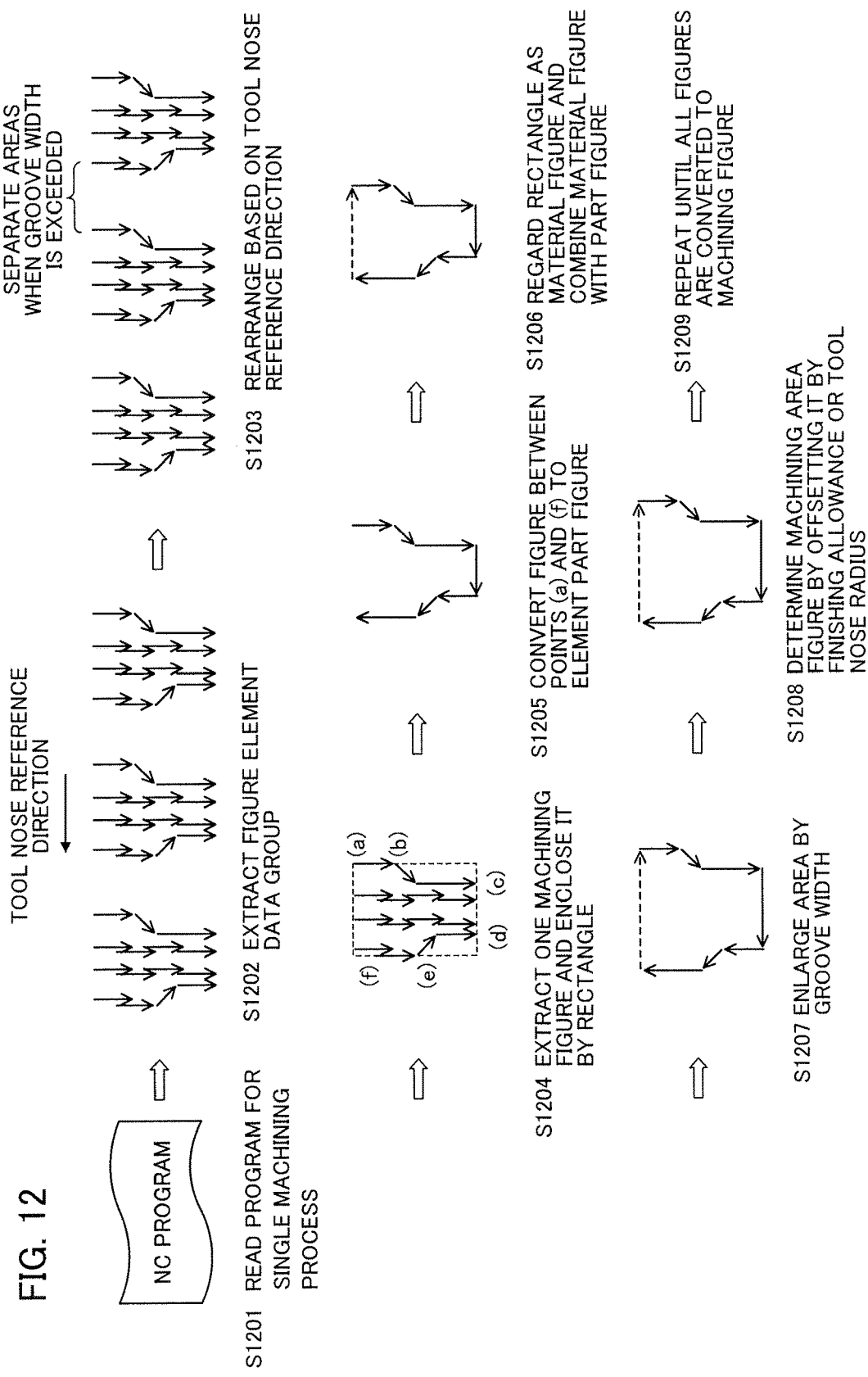
FIG. 12 illustrates steps of a process of generating a machining area figure when the type of machining is rough turning grooving.

FIG. 12 shows a flow of machining area figure generation process that is performed when the machining type identified from the single machining process recognized by the single machining process recognition section 20 is rough turning grooving.

In the machining area figure generation process for rough turning grooving, the machining area figure generation section 33 first extracts a figure element data group from the single machining process recognized by the single machining process recognition section 20 (steps S1201 and S1202).

When the figure element data group is extracted, the machining area figure generation section 33 rearranges the extracted figure element data group so that the figure element data are arranged based on a tool nose reference direction, locates intervals between neighboring sets of figure element data that are greater than a groove width, regards such intervals as boundaries between the neighboring sets of figure element data, and extracts individual sets of figure element data as those of separate machining areas (step S1203).

Next, the machining area figure generation section 33 extracts figure element data of one machining area, and obtains rectangle data that includes the whole extracted figure element data (step S1204).

Next, the machining area figure generation section 33 extracts continuous figure element data between points (a) and (f), and converts the extracted figure element data to an element part figure (step S1205).

Next, the rectangle obtained in step S1204 is regarded as a material figure, and the material figure is combined with the element part figure obtained in step S1205 (step S1206)

Next, the area is enlarged by an amount equivalent to the groove width (step S1207).

Next, a machining area figure for a machining cycle is generated by offsetting it by a finishing allowance or a tool nose radius (step S1208).

Steps S1204 to S1208 are then repeated until all the machining areas are converted to machining area figures.

[Procedure of Machining Area Figure Generation Process for Finish Turning Grooving]

Figure 13:
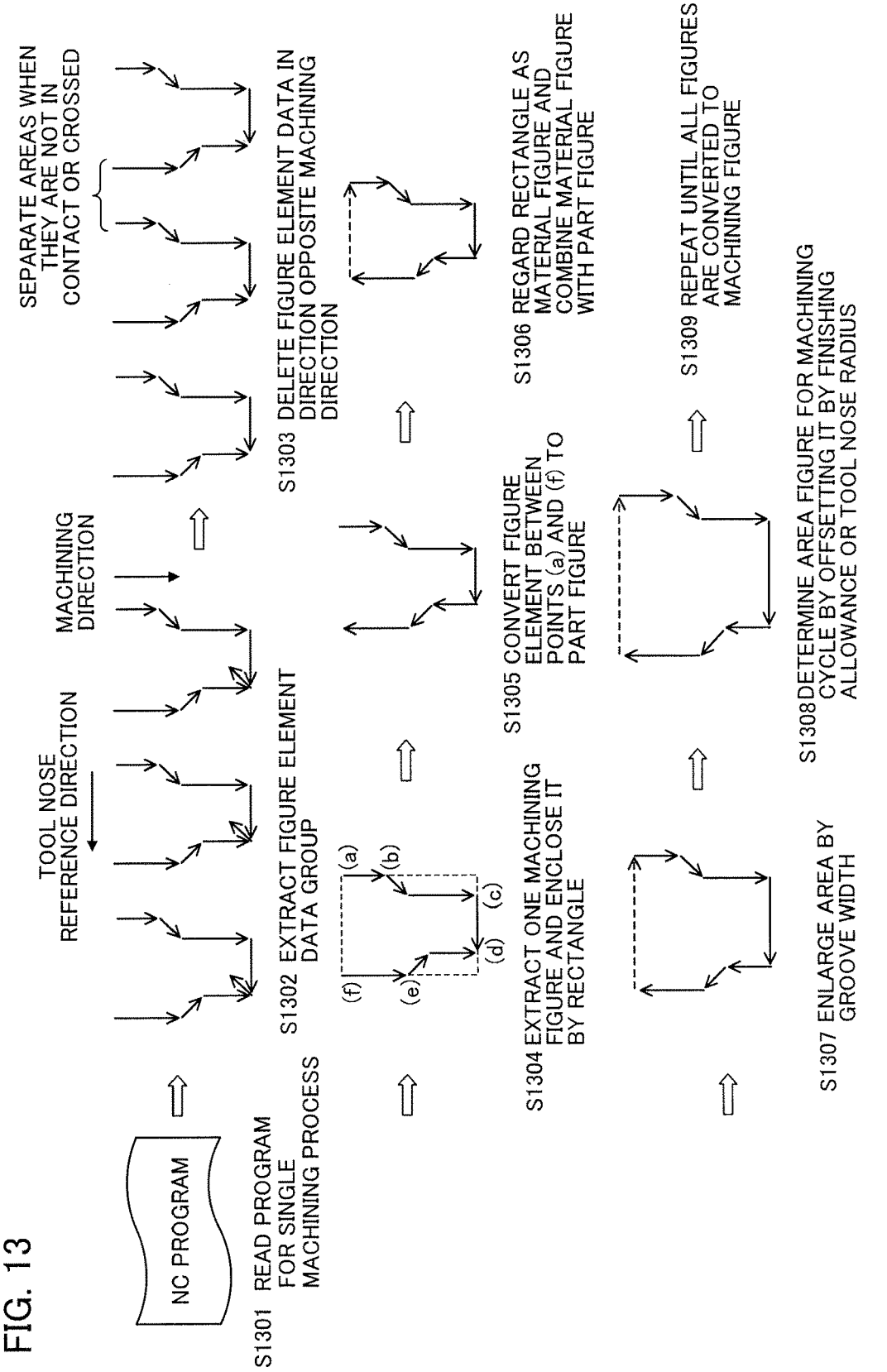
FIG. 13 illustrates steps of a process of generating a machining area figure when the type of machining is finish turning grooving.

FIG. 13 shows a flow of machining area figure generation process that is performed when the machining type identified from the single machining process recognized by the single machining process recognition section 20 is finish turning grooving.

In the machining area figure generation process for finish turning grooving, the machining area figure generation section 33 first extracts a figure element data group from the single machining process recognized by the single machining process recognition section 20 (steps S1301 and S1302).

When the figure element data group is extracted, the machining area figure generation section 33 identifies figure element data for machining in an opposite direction from the extracted figure element data group, and then deletes the identified figure element data (step S1303).

Next, the machining area figure generation section 33 extracts figure element data of one machining area, and obtains rectangle data that includes the whole extracted figure element data (step S1304).

Next, the machining area figure generation section 33 converts continuous figure element data between points (a) and (f) to an element part figure (step S1305).

Next, the rectangle obtained in step S1304 is regarded as a material figure, and the material figure is combined with the element part figure obtained in step S1305 (step S1306).

Next, the area is enlarged by an amount equivalent to the groove width (step S1307).

Next, a machining area figure for a machining cycle is generated by offsetting it by a finishing allowance or a tool nose radius (step S1308).

Steps S1304 to S1308 are then repeated until all the machining areas are converted to machining area figures.

[Procedure of Machining Area Figure Generation Process for Drilling]

Figure 14:
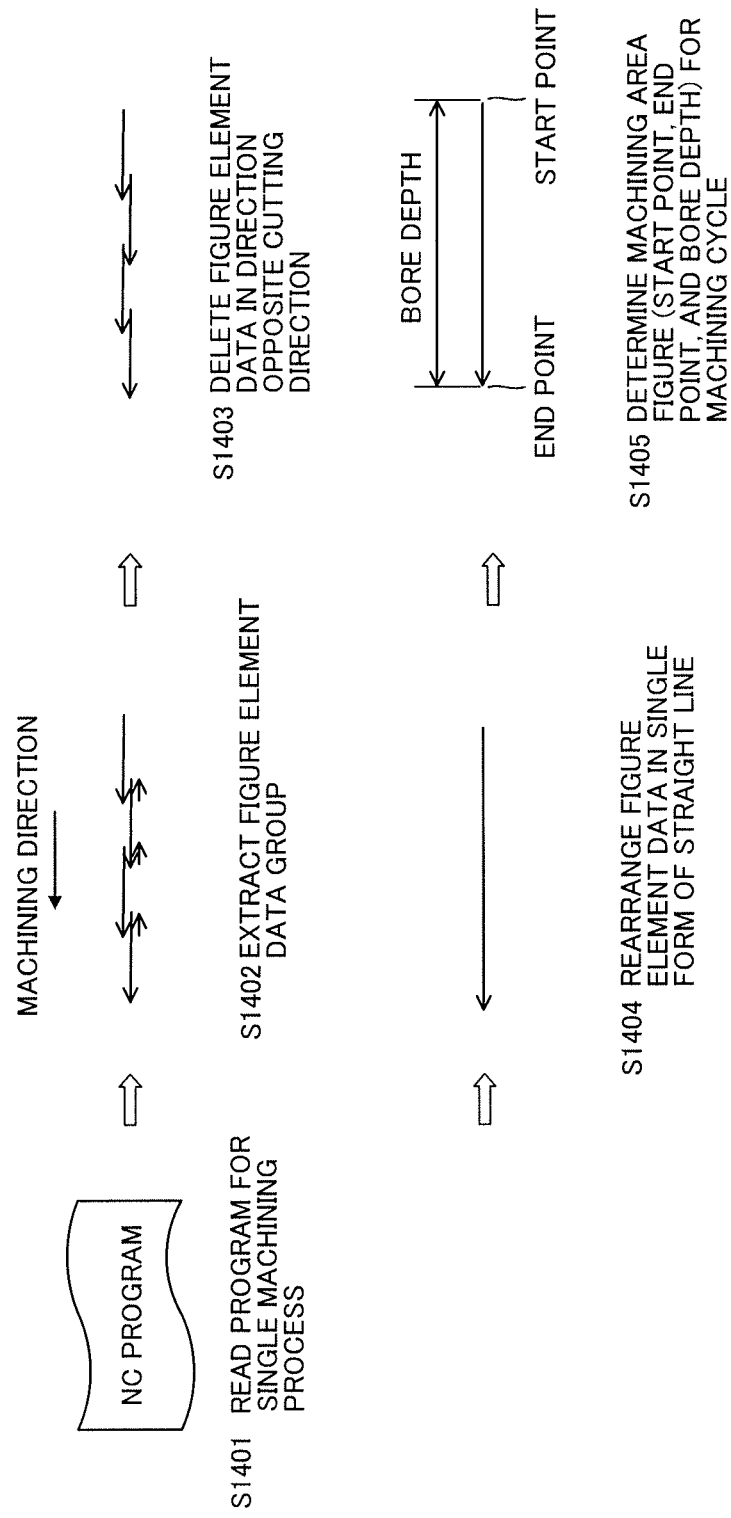
FIG. 14 illustrates steps of a process of generating a machining area figure when the type of machining is drilling.

FIG. 14 shows a flow of machining area figure generation process that is performed when the machining type identified from the single machining process recognized by the single machining process recognition section 20 is drilling.

In the machining area figure generation process for drilling, the machining area figure generation section 33 first extracts a figure element data group from the single machining process recognized by the single machining process recognition section 20 (steps S1401 and S1402).

When the figure element data group is extracted, the machining area figure generation section 33 identifies figure element data for cutting in a direction opposite the machining direction from the extracted figure element data group, and then deletes the identified figure element data (step S1403).

Next, the machining area figure generation section 33 rearranges the figure element data in a single form of a straight line (step S1404).

Finally, the machining area figure generation section 33 determines a start point, an end point, and a bore depth that define the machining area figure of a machining cycle (step S1405).

[Procedure of Machining Area Figure Generation Process for Facing]

Figure 15:
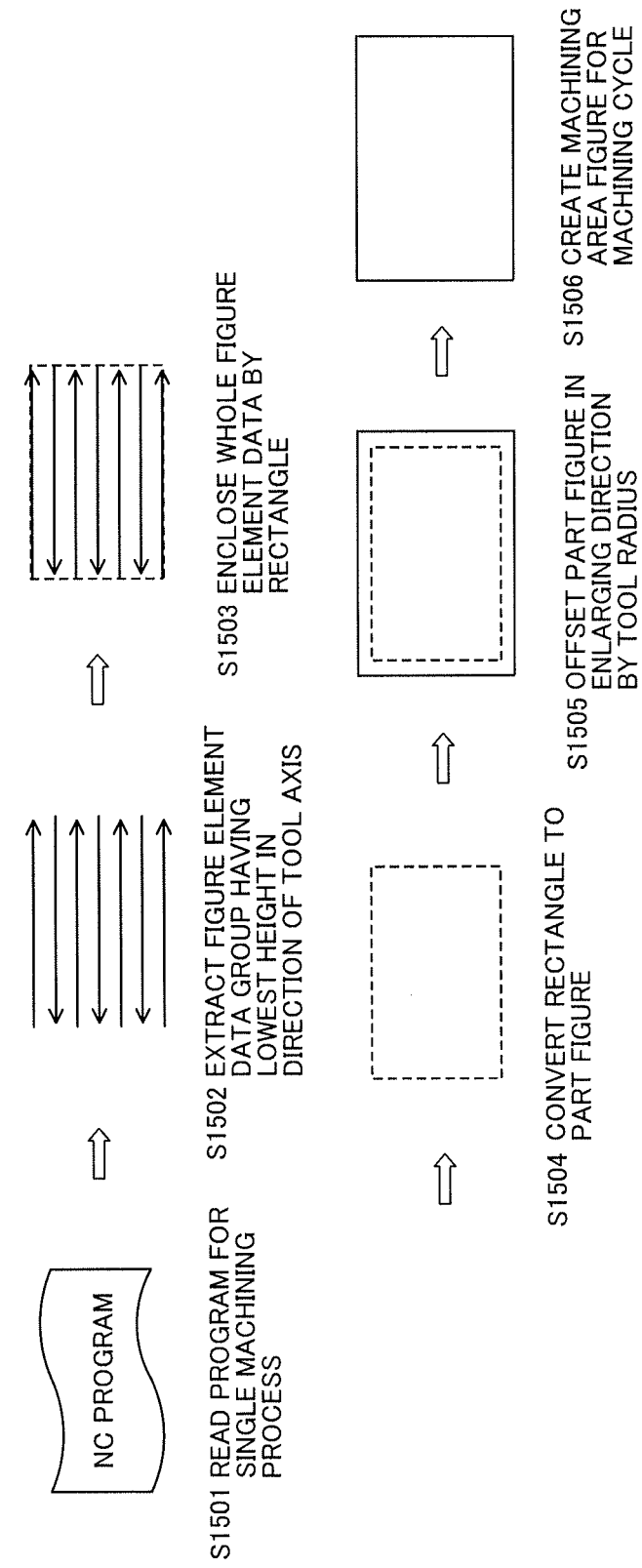
FIG. 15 illustrates steps of a process of generating a machining area figure when the type of machining is facing.

FIG. 15 shows a flow of machining area figure generation process that is performed when the machining type identified from the single machining process recognized by the single machining process recognition section 20 is facing.

In the machining area figure generation process for facing, the machining area figure generation section 33 first extracts a figure element data group having the lowest height in the direction of a tool axis from the single machining process recognized by the single machining process recognition section 20 (steps S1501 and S1502).

When the figure element data group is extracted, the machining area figure generation section 33 obtains rectangle data that includes the whole extracted figure element data (step S1503).

Next, the rectangle obtained in step S1503 is converted to a part figure (step S1504).

Next, the part figure obtained in step S1504 is offset in an outwardly enlarging direction by a tool radius (step S1505).

Finally, the machining area figure generation section 33 creates a machining area figure for a machining cycle from the offset part figure obtained in step S1505 (step S1506).

[Procedure of Machining Area Figure Generation Process for Contouring]

Figure 16:
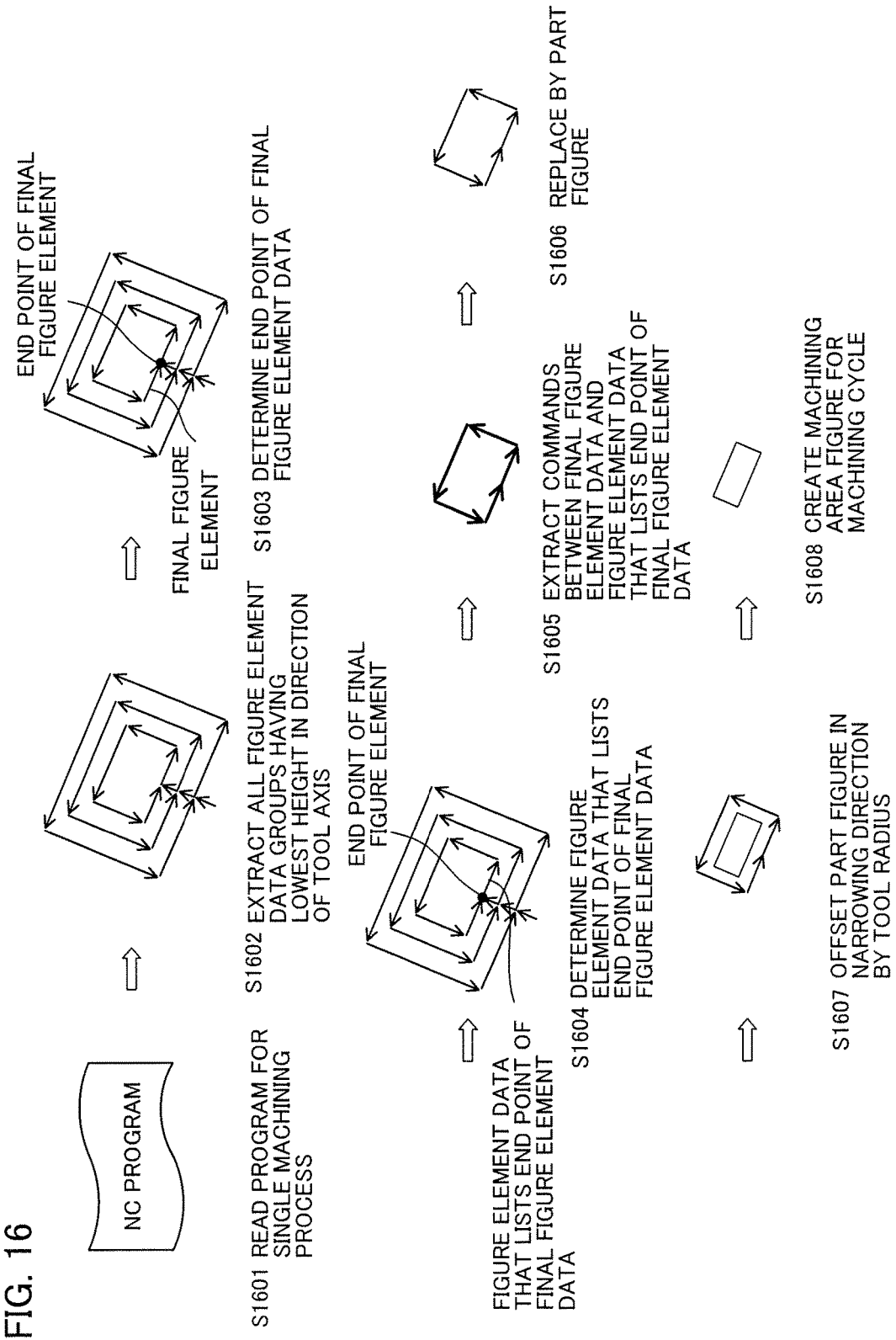
FIG. 16 illustrates steps of a process of generating a machining area figure when the type of machining is contouring.

FIG. 16 shows a flow of machining area figure generation process that is performed when the machining type identified from the single machining process recognized by the single machining process recognition section 20 is contouring.

In the machining area figure generation process for contouring, the machining area figure generation section 33 first extracts a figure element data group having the lowest height in the direction of a tool axis from the single machining process recognized by the single machining process recognition section 20 (steps S1601 and S1602).

When the figure element data group is extracted, the machining area figure generation section 33 identifies final figure element data from the extracted figure element data, and determines the end point of the identified final figure element data (step S1603).

Next, the machining area figure generation section 33 obtains figure element data which lists the final figure element data (step S1604), and extracts figure element data between the final figure element data and figure element data which lists the end point of the final figure element data (step S1605).

Next, the machining area figure generation section 33 converts the extracted figure element data to a part figure (step S1606), and offsets the part figure in the direction of narrowing the part figure by a tool radius (step S1607).

Finally, the machining area figure generation section 33 creates a machining area figure for a machining cycle from the offset part figure obtained in step S1607 (step S1608).

[Procedure of Machining Area Figure Generation Process for Pocketing]

Figure 17:
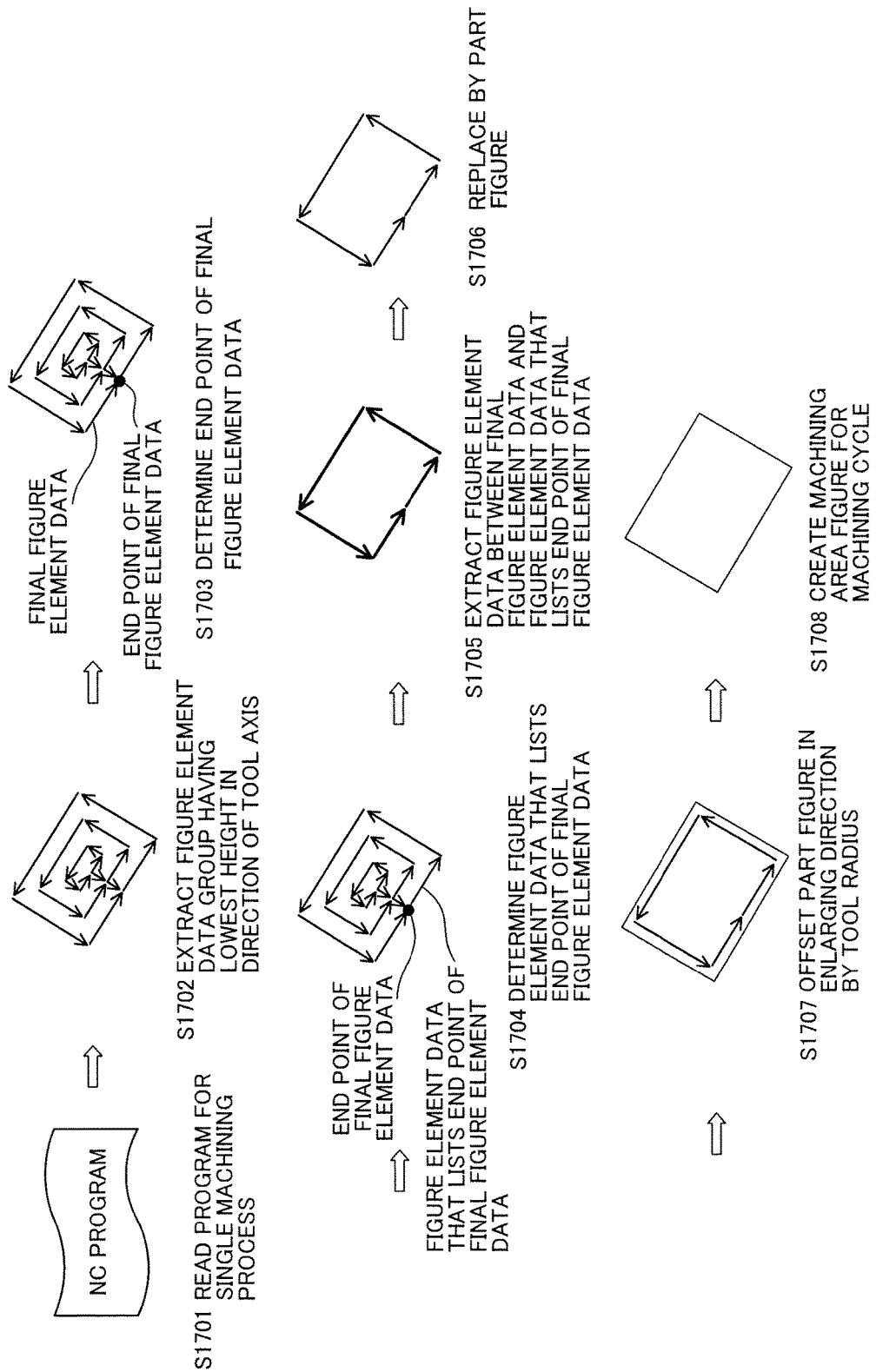
FIG. 17 illustrates steps of a process of generating a machining area figure when the type of machining is pocketing.

FIG. 17 shows a flow of machining area figure generation process that is performed when the machining type identified from the single machining process recognized by the single machining process recognition section 20 is pocketing.

In the machining area figure generation process for pocketing, the machining area figure generation section 33 first extracts a figure element data group having the lowest height in the direction of a tool axis from the single machining process recognized by the single machining process recognition section 20 (steps S1701 and S1702).

When the figure element data group is extracted, the machining area figure generation section 33 identifies final figure element data from the extracted figure element data, and determines the end point of the identified final figure element data (step S1703).

Next, the machining area figure generation section 33 obtains figure element data which lists the final figure element data (step S1704), and extracts figure element data between the final figure element data and figure element data which lists the end point of the final figure element data (step S1705).

Next, the machining area figure generation section 33 converts the extracted figure element data to a part figure (step S1706), and offsets the part figure in the direction of enlarging the part figure by a tool radius (step S1707).

Finally, the machining area figure generation section 33 creates a machining area figure for a machining cycle from the offset part figure obtained in step S1707 (step S1708).

The invention claimed is:

1. A numerical controller that performs machining control of a machine tool by using a numerical controller ("NC") program, the numerical controller including a processor configured to perform a method for controlling the machining of a workpiece, the method comprising:

recognizing, by the processor as a single machining process for a first tool, one or more blocks of machining commands for a first tool number previously designated by a first NC program based on a block for a tool change command for a second tool number being designated by the first NC program;

identifying, by the processor from a tool data list, a machining type and associated tool figure data based on the first tool number previously designated by the first NC program, wherein a machining type and associated tool figure data are predefined for each tool number of a plurality of tool numbers;

identifying, by the processor from a cutting conditions table, cutting conditions for the single machining process based on the identified machining type;

generating, by the processor, a machining area figure for the identified cutting conditions by extracting all cutting feed commands for the identified cutting conditions from one or more blocks of the first NC program for the single machining process;

generating, by the processor, a machining cycle command for the first tool from the recognized single machining process for the first tool based on the identified cutting conditions and generated machining area figure;

generating, by the processor, a new NC program in which the recognized single machining process for the first tool of the first NC program is replaced by the generated machining cycle command for the first tool, wherein the new NC program has a smaller number of blocks than blocks of the first NC program; and controlling of the machine tool by using the new NC program.

2. The numerical controller according to claim 1, wherein the cutting condition table associates a machining type with necessary cutting conditions.

3. The numerical controller according to claim 1, wherein generating the machining area figure for the identified cutting conditions by extracting all cutting feed commands for the identified cutting conditions from one or more blocks of the first NC program for the single machining process includes:
converting the extracted cutting feed commands to figure element data, which is at least one of a linear figure and a circular figure.

4. The numerical controller according to claim 3, wherein the machining area figure is generated by offsetting the figure element data by at least one of a magnitude of a tool nose radius of the first tool and a tool diameter of the first tool.

5. A computer-implemented program editing method for generating a numerical controller ("NC") program for a numerical controller that performs machining control of a machine tool, the NC program being partly replaced by a machining cycle command, the program editing method comprising the steps of:
recognizing, by a processor as a single machining process for a first tool, one or more blocks of machining commands for a first tool number previously designated by a first NC program based on a block for a tool change command for a second tool number being designated by the first NC program;
identifying, by the processor from a tool data list, a machining type and associated tool figure data based on the first tool number previously designated by the first NC program, wherein a machining type and associated tool figure data are predefined for each tool number of a plurality of tool numbers;
identifying, by the processor from a cutting conditions table, cutting conditions for the single machining process based on the identified machining type;
generating, by the processor, a machining area figure for the identified cutting conditions by extracting all cutting feed commands for the identified cutting conditions from one or more blocks of the first NC program for the single machining process;
generating, by the processor, a machining cycle command for the first tool from the recognized single machining process for the first tool based on the identified cutting conditions and generated machining area figure; and
generating, by the processor, a new NC program in which the recognized single machining process for the first tool of the first NC program is replaced by the generated machining cycle command for the first tool, wherein the new NC program has a smaller number of blocks than blocks of the first NC program,
wherein the numerical controller performs machining control of the machine tool by using the new NC program.

6. The program editing method according to claim 5, further comprising:
storing, in at least one of a memory and a storage device, the tool data list in which the machining type and tool figure data are defined for each tool number.

7. The program editing method according to claim 5, further comprising:
storing, in the at least one of the memory and the storage device, the cutting condition table that associates the machining type with necessary cutting conditions.

8. The program editing method according to claim 5, wherein generating the machining area figure for the identified cutting conditions by extracting all cutting feed commands for the identified cutting conditions from one or more blocks of the first NC program for the single machining process includes:
converting the extracted cutting feed commands to figure element data, which is at least one of a linear figure and a circular figure.

9. The program editing method according to claim 8, wherein the machining area figure is generated by offsetting the figure element data by at least one of a magnitude of a tool nose radius of the first tool and a tool diameter of the first tool.

* * * * *